United States Patent [19]
Macken

[11] Patent Number: 5,694,337
[45] Date of Patent: Dec. 2, 1997

[54] WATER SKI PERFORMANCE ANALYSIS METHOD AND APPARATUS

[76] Inventor: John A. Macken, 3755 Wallace Rd., Santa Rosa, Calif. 95404

[21] Appl. No.: 415,603

[22] Filed: Apr. 3, 1995

[51] Int. Cl.⁶ ............................................. G01B 3/00
[52] U.S. Cl. .................... 364/559; 364/558; 441/68; 242/904
[58] Field of Search ........................ 364/559, 411, 364/558; 441/65–79; 340/984; 116/26; 242/904; 114/242, 243, 246, 247, 253, 254

[56] References Cited

U.S. PATENT DOCUMENTS

| | | | |
|---|---|---|---|
| 4,624,141 | 11/1986 | Soleau | 73/865.8 |
| 4,893,577 | 1/1990 | Jennings | 114/253 |
| 5,018,474 | 5/1991 | Jellen | 114/253 |
| 5,041,040 | 8/1991 | Jones et al. | 441/69 |
| 5,110,310 | 5/1992 | Hobbs | 440/1 |
| 5,167,550 | 12/1992 | Nielsen | 440/84 |
| 5,272,435 | 12/1993 | McBroom | 324/179 |
| 5,381,141 | 1/1995 | Stahl | 340/984 |

*Primary Examiner*—James P. Trammell
*Attorney, Agent, or Firm*—Larry D. Johnson

[57] ABSTRACT

Disclosed is a method of measuring the performance of a maneuvering water skier. A series of angular measurements are made on the ski rope relative to a predetermined direction. This information, together with timing information is provided to a computer processing unit which calculates a score after predetermined maneuvers are completed. An apparatus for making both angle and force measurements is described.

10 Claims, 5 Drawing Sheets

1
WATER SKI PERFORMANCE ANALYSIS METHOD AND APPARATUS

BACKGROUND OF THE INVENTION

1. Field of the Invention

This invention relates to a method and means to measure the performance of a water skier.

2. Description of Prior Art

Water skiing is a very popular sport but the majority of participants do not have access to a slalom ski course consisting of precisely positioned buoys. Currently, slalom water ski competitions consists of a water skier weaving around the outside of the buoys. The speed of the boat is increased and the length of the rope towing the skier is decreased thereby increasing the difficulty until the winner is found. The lack of availability of slalom ski courses means that it would be desirable to have another way to measure the performance of a slalom water skier which can be utilized by recreational skiers on open water. The invention described herein not only fulfills this need but also permits a water skier to scientifically analyze skiing technique and compare this technique to other skiers.

SUMMARY OF THE INVENTION

The invention describes a method and means for measuring the performance of maneuvering water skier. The instantaneous position of the water skier can be calculated from angular information made by electronic equipment which measures the position of the ski rope relative to a pivot point and a reference direction. A timed series of these angular measurements are made after a start signal. These multiple angle measurements are provided as electronic signals to a computer processing unit (CPU). Also time information is provided to the CPU. The CPU is programmed to calculate a score based on the rate of change of the angle measurement while the skier does predetermined maneuvers. Preferred embodiments for the angle measurement equipment are attached to a pylon which is the ski rope pivot. A reference direction for angle measurement can be relative to the boat or can be an external "fixed" direction. Repetitive force measurements can also be made.

2
DESCRIPTION OF PREFERRED EMBODIMENTS

The sport of water skiing is a large recreational industry. Most recreational power boats less than 10 meters long are quipped to pull water skiers. The sport has reached the point that there are more than 20 manufacturers of a type of boat known as "Tournament water ski tow boats". These boats have a number of features to optimize the task of pulling a water skier. One of these features is the placement of a pylon about in the middle of the boat. The ski rope is attached to this pylon so that a maneuvering water skier exerts a force near the middle of the boat. This placement minimizes any steering of the boat caused by side forces exerted on the boat by the water skier. Therefore, it is possible to measure the angle between a reference direction on the boat such as the center line of the boat (which passes through the center of the pylon) and the water skier in order to measure certain performance characteristics of the water skier. It is also possible to reference the angle measurements to an absolute direction. This will be discussed later. In the remainder of this description, the examples will be illustrated showing the water ski line connected to a centrally located pylon. However, it is to be understood that the principles described herein can also be applied to boats which have other types of attachment devices such as hardware on the transom of the boat. This placement merely degrades the accuracy of the performance measurement but does not nullify the principles involved.

Figure 1:
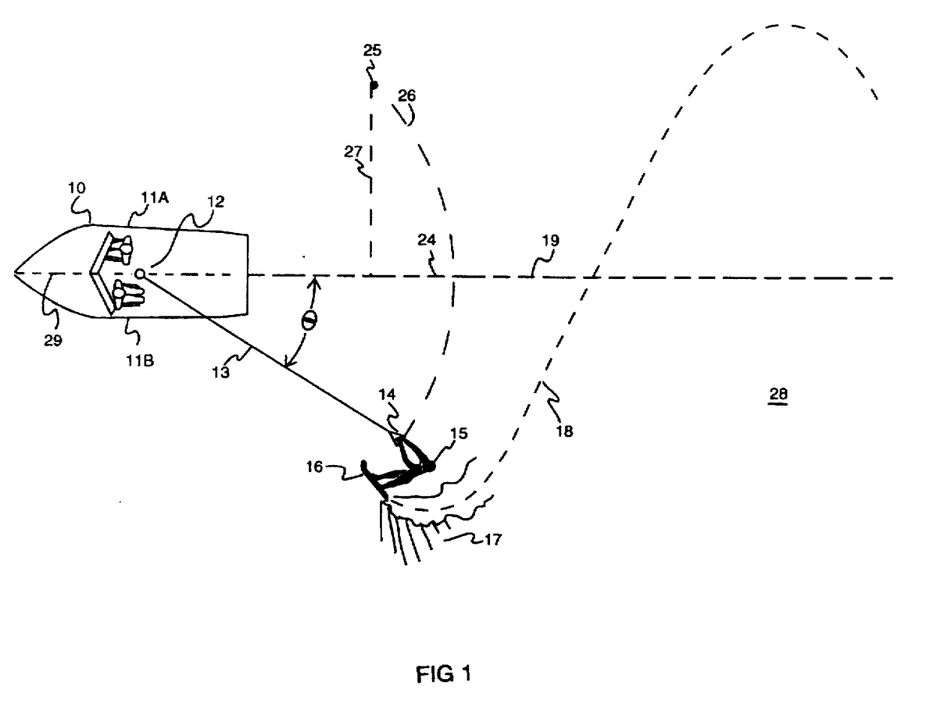
FIG. 1 shows a top view looking down on a boat pulling a maneuvering water skier.

FIG. 1 shows a top view looking down, on water (28) and on a ski tow boat (10) with a central pylon (12). Boat 10 also has an imaginary center line (29). A water ski rope (13) is connected to pylon 12 in such a way that the water ski rope has a pivot axis at pylon 12. Also, the water ski rope 13 is pulling a water skier (15). In FIG. 1, the water skier (15) is depicted making a high speed turn where the water skier leans over close to the water. The water ski (16) cuts through the water and produces a spray (17) and a track (18) in the water left by the wake of water ski. Dashed line (19) is an imaginary line which will be called the center line path of the boat. This can also be considered the approximate projection of the center line (29) of the boat (10). In FIG. 1, the driver and passenger are depicted as 11A and 11B respectively.

Angle θ in FIG. 1 is defined as being the instantaneous angle between the reference direction (19) and an imaginary straight line drawn between the rope pivot axis (12) and the skier (15). Since the rope is very close to forming a straight line between these two points, the present discussion will presume that angle θ also references the rope. The long axis of the rope will be called the "rope direction."

A great deal can be learned about a maneuvering water skier if angle θ depicted in FIG. 1 is repetitively measured as a function of time. To understand some of the concepts which are to be presented, it is desirable to use a frame of reference which moves with the boat. In this moving frame of reference, the boat in FIG. 1 would appear to be stationary and the water (28) would appear to move. In this case, the ski handle (14) will appear to move back and forth along the arc (26) as the skier maneuvers from side to side. Point 24 represents the point where arc 26 crosses the center line path (19). Also in this example, point 25 represents the furthest point that the handle (14) reached when the skier made his last turn on the right hand side of 19. In fact, the position of the ski handle (14) depicted in FIG. 1 represents the furthest point that the ski handle reaches on the left hand side of the center line for this particular turn. With each successive turn, the turnaround point (25), on the right side, and the equivalent point on the left side, will probably vary. The tangential distance ($D_T$) of a segment of arc 26 can be calculated given the radial distance (R) which is the rope length (the distance from 12 to 14) and the angle θ in radians (1 radian=57.3°). In FIG. 1, the tangential distance ($D_T$) between 24 and 14 is $D_T$=Rθ. The speed of an object moves along an arc such as 26 (ignoring the boat speed) will be referred to as the "tangential speed." In all future reference to tangential speed or tangential distance, only the absolute value of the distance or speed will be used. Measurements of distance along 19 which includes the motion of the boat will be called "longitudinal distance."

Figure 2:
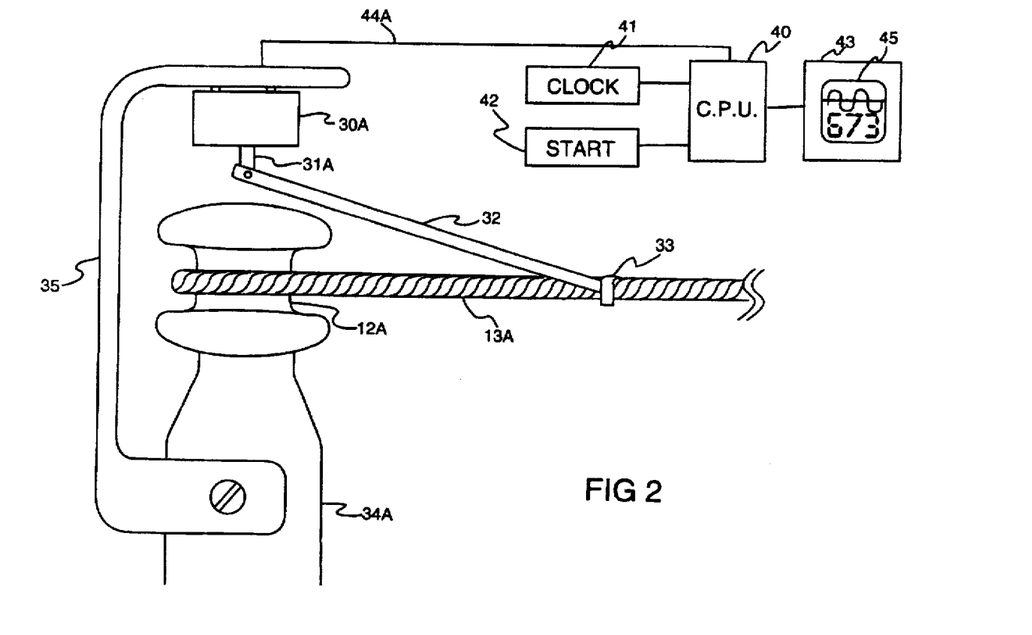
FIG. 2 shows a side view of a ski boat pylon equipped with an angular measurement device.

FIG. 2 depicts equipment actually tested as part of the research on this invention. Ski rope 13 has a loop (not visible from this angle )which goes around pylon head 12A. The rope slides on 12A so the rope pivot axis is the center of 12A. This pylon head also has an enlarged upper and lower section which keeps the loop at the end of rope 13 generally positioned as shown. For future reference, the lower portion of pylon will be referred to as the pylon base 34A. This is the portion of the pylon which is below the pylon head. A bracket (35), was attached to the pylon base (34A). A rotary optical encoder 30A with rotary shaft 31A was attached to bracket 35 and positioned so that shaft 31A was approximately centered over the axis of pylon head 12A. A rod coupling device (32) was attached to shaft 31A and to rope 13 at contact point 33. Multiple wires 44A went from encoder 30A to a computer processing unit (CPU) 40. In our experiment, a rotary encoder with 1,024 lines per revolution was used. In the experiment, the encoder and CPU combination was zeroed when the skier was skiing along line 17 depicted in FIG. 1. This also corresponds to having the center line of the boat be the reference direction for angle measurements. In our experiment, the CPU repetitively checked the position of the encoder every 250 microseconds (4000 Hz update rate). Other types of angular measurement devices could be repetitively checked at a much slower rate. However, because of the typical maneuvering rate of a water skier, important information is lost if the instantaneous angular position (not peak angle) is not known at least once a second. Also, the term "rotary transducer" will be used to denote angular measurement devices which have a rotary component and produce an electrical signal output.

An important part of providing this angular information to the CPU is correlating this angle information with a time reference. In FIG. 2, there is depicted an electronic clock (41) which feeds electronic time pulses to the CPU. In practice, this clock maybe a crystal oscillator which is usually a part of the CPU but conceptually it is shown here as a separate block because the program must import this information. Both the clock and the rotary transducer produce electric signals which are sent to the CPU. There was also a button to start the process. This is shown as block 42 in FIG. 2. When the button 42 is pressed, there is a process which is started and after a period of time, the CPU delivers to a display apparatus the results of the performance measurement which will be explained later. These results (score means) were displayed on a screen (45). These results (score means) were both a graph and a numerical score as depicted in 45.

In FIG. 2, shaft (31A) was approximately aligned with the pivot axis of rope 13. This is desirable for ease of computation but it may not be the most convenient for the user who must be able to easily remove the rope. It is possible to displace the axis of rotation of the rotary transducer 30A from the rope pivot axis if the CPU is programmed to make the additional computation required to accommodate a displacement of the rotary transducer 30A. For example, 30A could also be inverted and placed next to shaft 34A.

Figure 3:
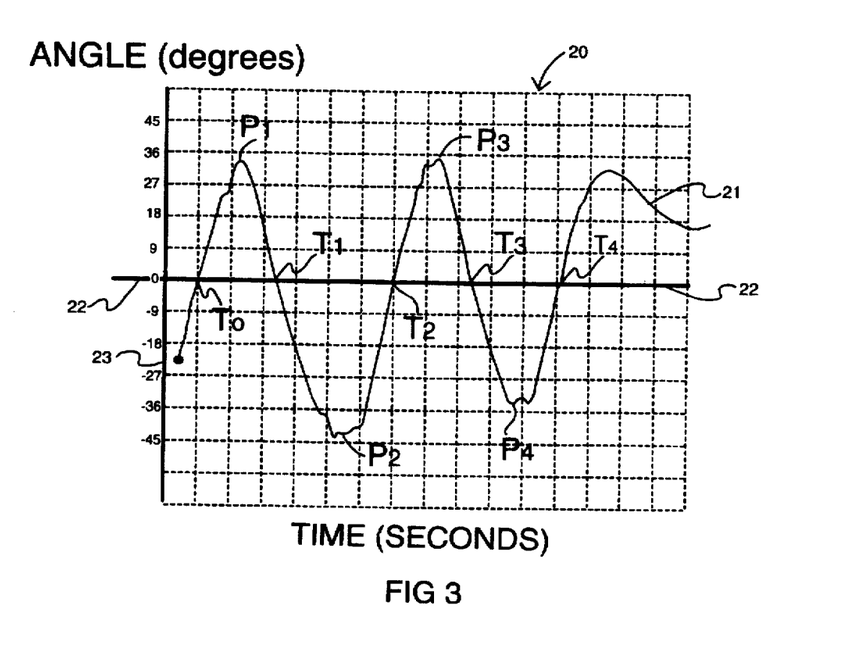
FIG. 3 shows a graph of rope angle versus time for a maneuvering water skier.

FIG. 3 shows a portion of an experimentally obtained graph which was made with the equipment previously described in FIG. 2. The Y axis of this graph is the angle of the rope direction relative to the boat center line as measured by the encoder 30A in FIG. 2. In this graph, each division of the Y axis is equal to 9 degrees (0.157 radians or 25.6 counts of the encoder). The X axis in this graph is time and each division is equal to 1.33 seconds. Line 22 is the reference direction (zero degrees) which was the boat center line which also approximates the center line path. At point 23 the start button was depressed and the angle of the rope was recorded as a function of time. The graph of this recording is line 21. When this graph was made, the length of the ski rope from the pylon to the handle was 16.16 meters (53 feet). The distance from the handle to the skier's shoulder was an additional 0.67 meter (2.2 feet) for a total distance (radius R) from the pylon to the skier's shoulder of 16.84 meters (55.2 feet). Therefore, each division in the Y axis is also equivalent to 2.64 meters (8.67 feet) of tangential distance along 26 depicted in FIG. 1. The X axis can also be regarded as a distance parallel to line 19 if the speed of the boat is known. This is also known as the longitudinal distance ($D_L$). In this experiment, the boat speed (Z) was 55 km/hr (34 mph). Therefore, in a 1.33 second time interval (one division), the boat has advanced a center line distance of 20 meters (66 feet) ($D_L$=ZT).

In FIG. 3, the point $T_0$ is defined as the first time the line 21 crosses the center line path 22 (zero crossing) after the start point 23. The point $P_1$ is the first peak (first turnaround), $P_2$ the second peak, etc. Similarly, $T_1$, $T_2$, etc., are subsequent zero crossings. These references for time and angular peaks will be important in calculating a score for the maneuvering water skier.

Angle θ was previously defined as the instantaneous angle measurement made from the reference direction to the line extending from the rope pivot axis to the skier. This line is approximated by measuring the ski rope direction. As the skier maneuvers, this angle changes, as seen in FIG. 3, it is possible to define angular speed (ω) as:

$$\omega = \frac{d\theta}{dt}$$

Where ω is the derivative of θ (in radius) with respect to time. The tangential speed (Q) is: Q=Rω.

Where R is the distance (radius) between the pivot axis and the object being tracked (either the handle or the skier). The tangential distance ($D_T$) between any two points such as 24 to 14 in FIG. 1 is: $D_A$=Rθ. The tangential acceleration ($A_T$) is: $A_T$=Rα.

Where α is angular acceleration and defined as $$\alpha = \frac{d\omega}{dt}.$$

The radial acceleration $A_R$ (centrifugal force) is defined as: $A_R$=ω²R.

The total acceleration (a) experienced by the skier (presuming a constant velocity for the boat) is: $a=(A_T^2+A_R^2)^{1/2}$.

To a slalom skier, an important measurement (score) is an overall maneuverability measurement which also takes into account the speed with which turns are made. The preferred measurement utilizes a variable time interval required for the skier to complete a predetermined number of crossings of the imaginary center line path. In this case, the skier is able to know when the measurement starts and stops. This concept can be illustrated by FIG. 3. After a start button is depressed at 23, the equipment does not immediately start the timing but instead is armed and waits for the next zero crossing (center line crossing) which in this example occurs at $T_0$. In this example, the length of time of the measurement will be whatever time it takes for four center line crossings (other intervals could also be chosen). This measurement time stops at T4. The total angle achieved ($\theta_T$) in this time period could be calculated either by a summation of the absolute value (positive value) of peaks between $T_0$ and $T_4$:

$\theta_T = 2(|P_1|+|P_2|+|P_3|+|P_4|)$.

or by a summation of the encoder angle counts $\theta_c$ (or other digital counts) observed by the CPU during the measurement time. In this case, $\theta_T$ would be defined as $$\theta_T = \sum_{T=0}^{n} \theta_c.$$

This summation of digital angle counts gives nearly the same answer as adding together the multiple peaks. However, it is possible for small vibrations in the rope to add to the $\theta_T$ total if small rope oscillations are also counted. For example, in FIG. 3, near point P4, there is a small dip which is ignored if the peak values are used but included if the total digital angle counts are used. These oscillations can also be minimized by mechanical damping.

There are several scores ($S_1$, $S_2$, etc.) which are good measurements of a skier's maneuverability. All of these scores can be scaled to a desirable numerical value by including constants ($K_1$, $K_2$, etc.). The preferred scores are:

$S_1 = K_1 \theta_T/(T_N-T_0)$ $S_2 = K_2 R \theta_T/(T_N-T_0)$ $S_3 = K_3 R \omega$ $S_4 = K_4 A_T$ Score $S_1$ is proportional to the total angle change covered by the maneuvering skier in a predetermined time. The radius information could be provided to the CPU by the user. Score $S_2$ is related to $S_1$ because it nearly multiplies this total angle change by the radius (R) to give a score which is proportional to the average tangential speed. For example, in FIG. 3, the time interval between T0 and T4 is about 14.66 seconds ($T_N-T_0=14.66$ sec). The total angle change in this period of time interval is about 297 degrees or ($P_1+P_2+P_3+P_4=5.18$ radians). Using rope length plus arm length of R=16.86 meters, the average tangential speed for this time interval was 5.96 meters per second ($S_2=K_2(16.86\times5.18)/14.66$). For this example, if $K_2=100$ then $S_2=596$. This score would be computed by the CPU and displayed on the display screen. In this illustration, four zero crossings were used for $T_N$ to compute the score. Other numbers could be chosen by the user. The preferred number is four or six zero crossings, depending on the endurance of the skier.

Score $S_3$ is proportional to the tangential speed achieved at a predetermined part of the maneuver. For example, at zero crossing $T_3$ in FIG. 3, the score $S_3=K_3(16.8\times0.59$ rad/sec). If $K_3=1$, then $S_3=9.92$ m/sec.

Score $S_4$ is proportional to tangential acceleration and preferably $S_4$ would be measured at the turns for a predetermined time interval. For example, in FIG. 3, using turn $P_3$ over a time interval of 0.9 seconds, $S_4=K_4(18.9$ m/sec$^2)$. If $K_4=0.102$ sec$^2$/m, then $S_4=1.9$. This constant $K_4$ gives an answer scaled to gravity. The skier had a tangential acceleration of 1.9G's in the turn which corresponds to $P_3$.

It is possible to use the angle, time and radius information to come up with other scoring formulas. For example, a score could relate to the average value of previously defined acceleration "a" over time interval $T_N-T_0$. For another example, in FIG. 1, line 27 is the transverse distance the skier has traveled from the center line. This is equal to: R cos. $\theta$. It would be possible to make formulas relating to the transverse distance or transverse speed. Also, $T_N-T_0$ could be a fixed time interval rather than a variable time which depends on maneuvers.

Another variation on this is to add a signaling device such as a beeper or strobe light so that the CPU can signal the skier when he has reached a predetermined transverse distance from the center line path. If the rope length is known, this occurs when the rope angle relative to the center line ($\theta$) reaches a predetermined value. The contest could then require that the skier at least reach this predetermined angle $\theta$ on each side of the center line path in order to receive full credit for the maneuver in computing the score.

It should be noted that the information contained in FIG. 3 can also be displayed in a number of different ways. For example, the same information can be computed and displayed as a graph of tangential speed (Q) versus time; or tangential speed versus longitudinal distance; tangential acceleration $A_T$ versus time; force versus time or force versus longitudinal distance (force measurements are discussed later). These plots can be displayed in real time or else they can be down loaded to a diskette and analyzed at a later time on a personal computer. Also it would be necessary to provide the CPU with the boat speed in order to obtain graphs which relate to longitudinal distance. This could be done by utilizing a speedometer transducer (not shown) connected to the CPU.

Figure 4:
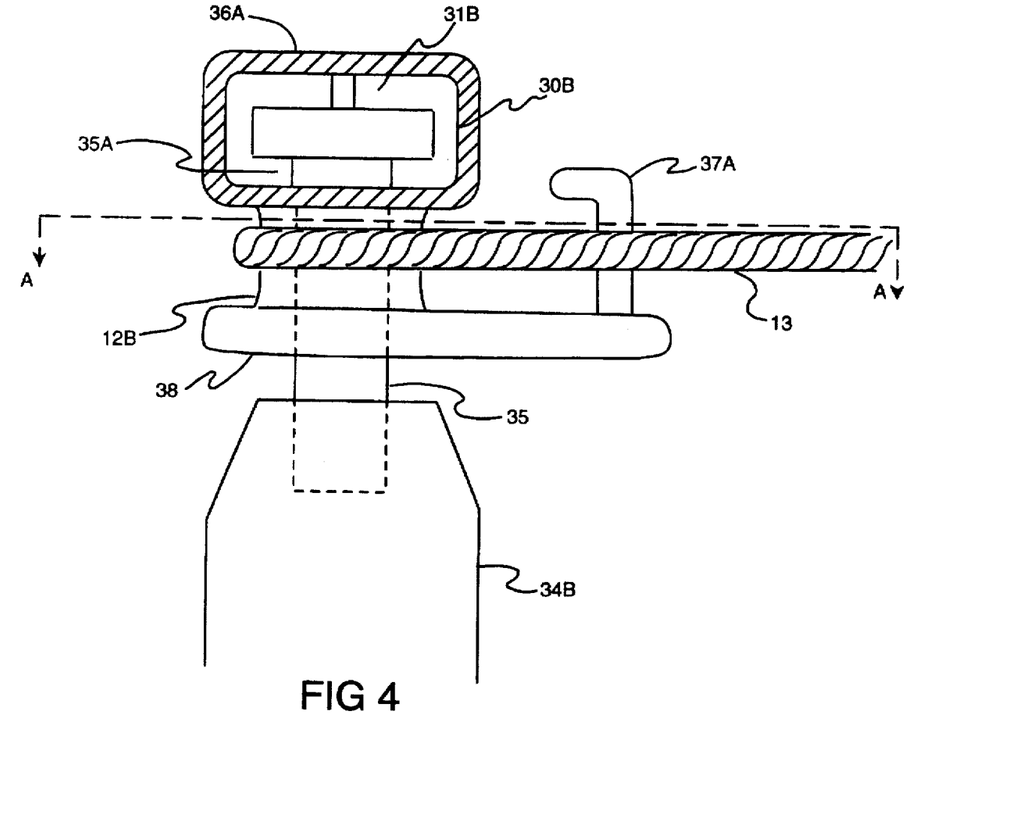
FIG. 4 shows a swivel head pylon equipped with an angle measuring device.

The pylon depicted in FIG. 2 was one solid unit and the rope 13 slid on the pylon surface. In U.S. Pat. Nos. 4,893,577 and 5,018,474, a pylon is described which has a cylindrical swivel head. This is mounted by an anti-friction bearing on a support pin permitting the pylon head to rotate about a vertical axis. In FIG. 4, a swivel head pylon (not necessarily cylindrical) is depicted but it also includes a device which permits measurement of the orientation angle of the swivel head. In this case, the rigid pylon member is 34B with support pin (35) rigidly attached to 34B. The swivel head is the attached components 12B, 38, 36, and 37A. In this case, a bearing (not shown) or bearing surface permits 12B to swivel around support pin 35. Also attached to 12B is a lower lip (38) and a upper cap (36). The angle measuring device is rotary transducer 30B.

Rotary transducers such as 30B can include, encoders, resolvers, synchros, potentiometers, and variable capacitors. All of these devices have two parts which can rotate relative to each other. One part does not rotate relative to a reference direction. This is usually done by attaching this first part to a reference surface. The second part can rotate around a predetermined axis. This part is usually attached to a coupling device which in turn is connected to the moving component which is to be measured. In FIG. 4, the case, 30B and non-movable internal transducer parts are attached to support pin 35. This establishes the reference direction since 35 does not rotate relative to the boat. Movable shaft 31B is also part of the rotary transducer. This shaft is connected to the second internal part of the rotary transducer which can rotate relative to the case 30B. Shaft 31B is also connected to cap 36. Cap 36 rotates with 12B, 38, and 37A. These components can collectively be called a "coupling device" which connects 31B to rope 13. Electrical wires carrying the signal from 30B are not shown but they could be passed through a holed drilled through support pin 35. More details about the construction, component parts and operation of rotary transducers are discussed in the following books:

"Handbook of Transducers", by Harry N. Norton, Prentice Hall,

"Transducers, Theory and Application," by John Allocca, Reston Publishing Company, Reston, Va.

Also, discussed in these books are linear transducers such as metallic foil strain gauges, semi-conductor strain gauges, linear variable differential transformers, linear capacitive transducers, piezoelectric transducers, and linear potentiometric transducers. These linear devices are force transducers when they are mounted on components which convert force to linear motion. These will be discussed later.

The various rotary and linear devices mentioned can either produce an output signal which is digital or analog. The digital devices interface best with computer processing units. It is possible to add an intermediate device known as an analog-to-digital (A to D) converter to assist analog devices. Also, variable capacitive transducers can produce a variable frequency electrical oscillation which can be converted to an analog or a digital signal. Methods of handling these signals are discussed in these books. Therefore, it should be understood that the exact type of measuring device is not critical to this invention.

Figure 5:
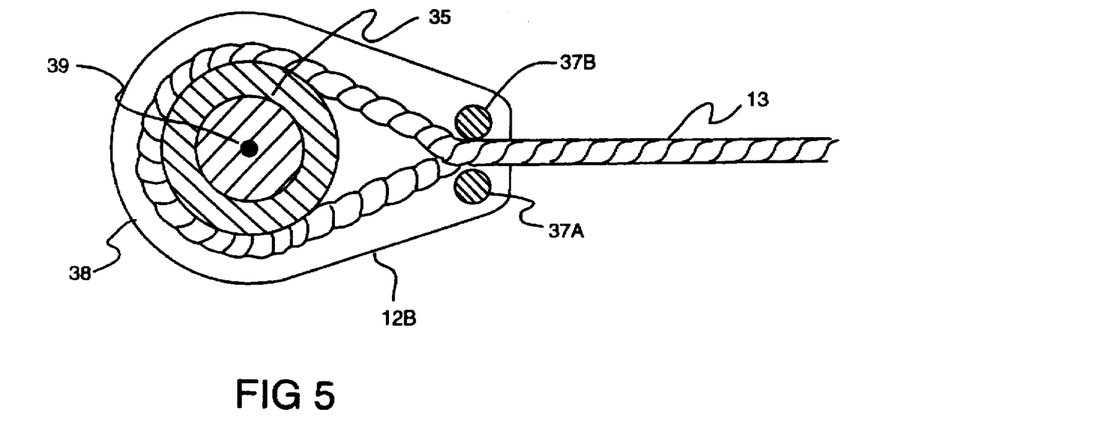
FIG. 5 shows a cross sectional view of the pylon shown in FIG. 4 cut along lines A—A.

In the previously mentioned U.S. Pat. Nos. 4,893,577 and 5,018,474, the swivel head is cylindrical. When the rope direction is to be measured, it is desirable to have a non-cylindrical structure so that the rope leaving the pylon orients the swivel head to permit the tracking of the rope. There are a number of possible ways of achieving this and several can be explained here. FIG. 5 is a cross sectioned view of FIG. 4 cut along lines A—A. Here it can be seen that the rope 13 passes between two pins 37A and 37B. These pins eliminate symmetry around pivot axis 39 for the swivel head. These pins help orient the swivel head. In FIG. 4, pin 37A is depicted with a right angle bend which permits it to capture the loop of rope 13 if this rope was placed over pin 37A rather than around shaft 12B. Clearly this would also orient swivel head 12B to the force direction of the rope and to the direction of the skier. The exact geometry of the swivel head is not critical as long as the swivel head tracks the rope direction. Another alternative would be to have pin 37A in FIG. 4 be a single pin and have the loop of rope 13 twisted so that it makes the FIG. "8" with one portion of the FIG. "8" around 12B and the other portion around 37A.

In FIG. 5, the axis of rotation for the swivel head 12B and the associated hardware is depicted as point 39. This is the end view of this generally vertical axis which is also called the "rope pivot axis." There is always a region which can be called the rope pivot axis even when the attachment apparatus does not have a pivot head.

Figure 6:
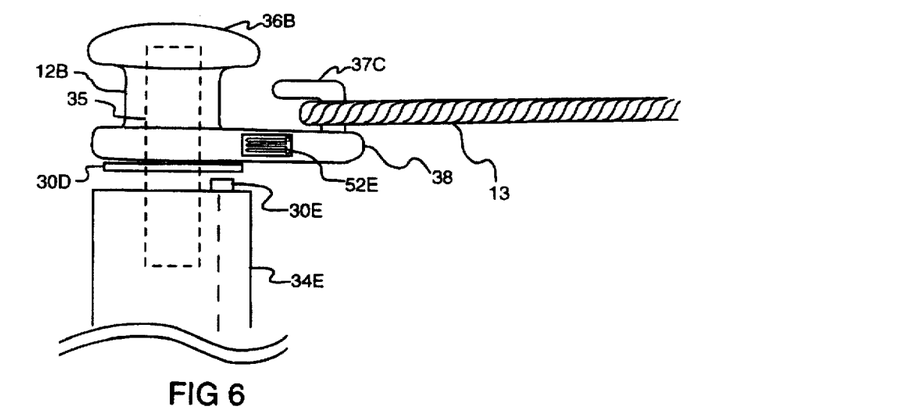
FIG. 6 shows a swivel head pylon where a rotary transducer is integrated into the structure.
Figure 7:
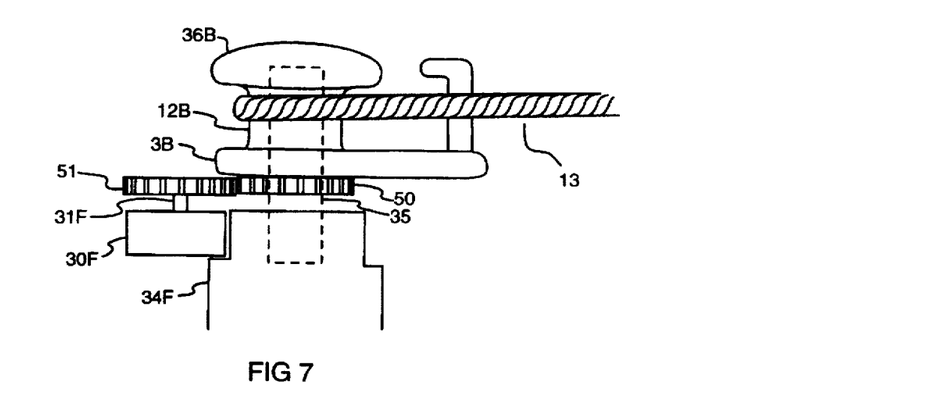
FIG. 7 shows a swivel head pylon which uses gears to displace the rotary transducer.

FIGS. 6 and 7 show two additional possible placements of rotary transducers. FIG. 6 is similar to FIG. 4 except that a component labeled 30D has been connected to the swivel head which includes 12B, 38, 27C, and 36B. In this case, component 30D is connected to lower lip 38 so that 30D will rotate with the swivel head. Component 30E shown in FIG. 6 is attached to pylon 34E and does not rotate with the swivel head. 30D and 30E are the movable and stationary components (respectively) of the rotary transducers. For example, 30D in FIG. 6 could be a glass disk containing multiple fine lines such as used in an optical encoder. In this case, 30E would be the light source and detector combination typically used in reflective optical encoders which monitor the movement of the multiple lines. Transmissive optical encoders require that the detector be separated from the light source. This could require a "C" bracket spanning the encoder disk (30D). There are also brush encoders in which case 30D and 30E could be the appropriate rotating and stationary components. In FIG. 6, a slight gap is depicted between 30D and 30E. However, in some rotary transducers such as potentiometers, there would be a sliding physical contact between these two components. If the angle measuring principle was based on rotary capacitive measurements, then there would be no contact between 30D and 30E but 30E maybe larger than depicted.

Since there is a great multitude of rotary transducers, the main feature to be illustrated in FIG. 6, is that in this figure, the two components of the rotary transducer have been integrated with the pylon and swivel head so that pin 35 is used both as the rotary shaft for the head and also is used for the axis of rotation of the rotary transducer. FIG. 6 also illustrates another variable which was previously mentioned. In this case, rope 13 is looped around post 37C rather being looped around 12B. In this case, 37C is a single pin rather than the double pins illustrated in FIG. 5 as 37A and 37B. This rope attachment point is displaced compared to the pivot axis which goes down the center of 35. This orients the swivel head to point towards the skier. Component 52 in FIG. 6 will be explained later.

FIG. 7 illustrates another possible placement of the rotary measuring transducer 30F. In this case, this transducer, 30F, is attached to the side of pylon 34F. Shaft 31F for the rotary transducer is no longer aligned with the center of pin 35 which is the axial used for the component the pivot head. A connection is made between the swivel head and the rotary transducer using gears which are illustrated as 50 and 51 in FIG. 7. In this case, gear 50 is connected to lower lip 38 while gear 51 is connected to shaft 31F. In this illustration, there is meshing between these two gears. However, it is also possible to use a timing belt or other chain like component to connect gears 50 and 51. In both FIGS. 6 and 7, it is also desirable to have some form of protective cover for the rotary transducers. However, this protective cover is not essential and not shown to better illustrate the other components.

Until now the illustrations have focused on obtaining angular information. However, a completely instrumented pylon would also obtain force information as a function of time. As the skier goes through his maneuvers, the force on the rope changes dramatically. For example, there is very little force on the rope as the skier is making the high speed turns. There is a peak force on the rope which occurs slightly after the completion of each high speed turn. It is possible to draw a graph of the force on the rope versus time. This force graph would be somewhat similar to the angle versus time graph shown in FIG. 3. The force graph could also be drawn with the X axis being longitudinal distance as previously discussed in FIG. 3.

Figure 8:
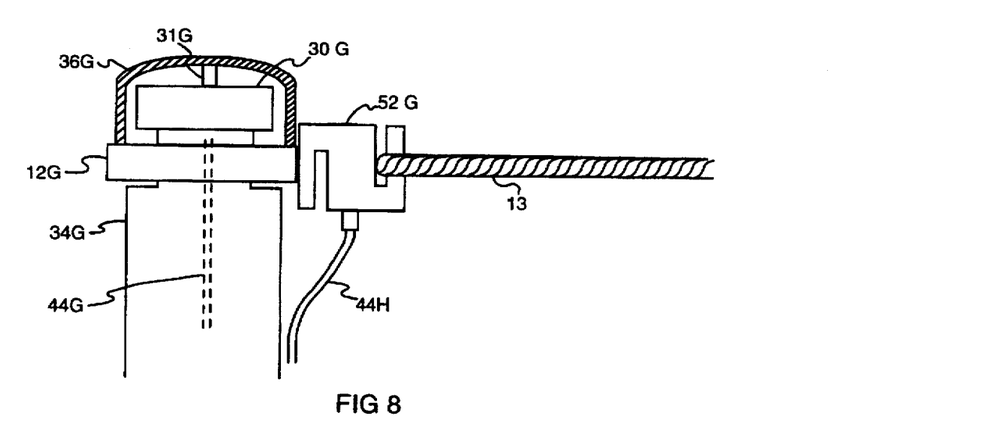
FIG. 8 shows a swivel head pylon which uses ball bearings and also includes a force transducer.

To obtain the information for the force analysis, it is necessary to include some form of force transducer on to the instrumented pylon. FIG. 8 illustrates this concept. The pylon shaft is 34G. In this case, the swivel head, 12G, is illustrated as being as a sealed bearing with balls 54. The inner race of this bearing is attached to and an extension of shaft 324G. A force transducer (52G) is attached to the outer race of bearing 12G. This force transducer is illustrated as being an "S" beam load cell. This type of force transducer is commonly used to make scales. It usually has strain gauges attached below the surface of the "S" bead load cell.

The rope, 13, is attached to one portion of this load cell so that forces on rope 13 produces stresses and strains inside the load cell. These are measured by the hidden strain gauges and the electrical signal is transmitted through wire 44H. In FIG. 8, the rotary transducer is shown as 30G with shaft 31G attached to cover 36G. As previously explained in FIG. 4, a rotation of cover 36G (which is attached to 12G) causes a rotation of shaft 31G compared to 30G. The electrical signal from this rotary transducer is transmitted through wires 44G which pass through a hole in shaft 34G. It should be understood that other force transducers can be substituted for the "S" beam load cell 52G. Also, the placement of 52G between the rope 13 and the support shaft 34G causes the load cell to feel a tension. It would also be possible to place the force transducer 54G on the opposite side of 34G and loop the rope around the force transducer such that the rope 13G, would exert a compressive force on the transducer. Other variations of these principles can also be instituted without departing from the basic principle of instrumenting the pylon to measure and repetitively monitoring this force at a frequency greater than once a second so that a CPU can provide a force versus time graph or a force versus distance graph.

Another variation on a force transducer is illustrated in FIG. 6. Here strain gauge 52E is connected to the lower lip (38) of the pivot head. A force on rope 13 produces a strain in lower lip 38 which is sensed by strain gauge 52E. In operation, two electrical wires would be connected to 52E but these have been omitted from FIG. 6 to better illustrate the other components.

Figure 9:
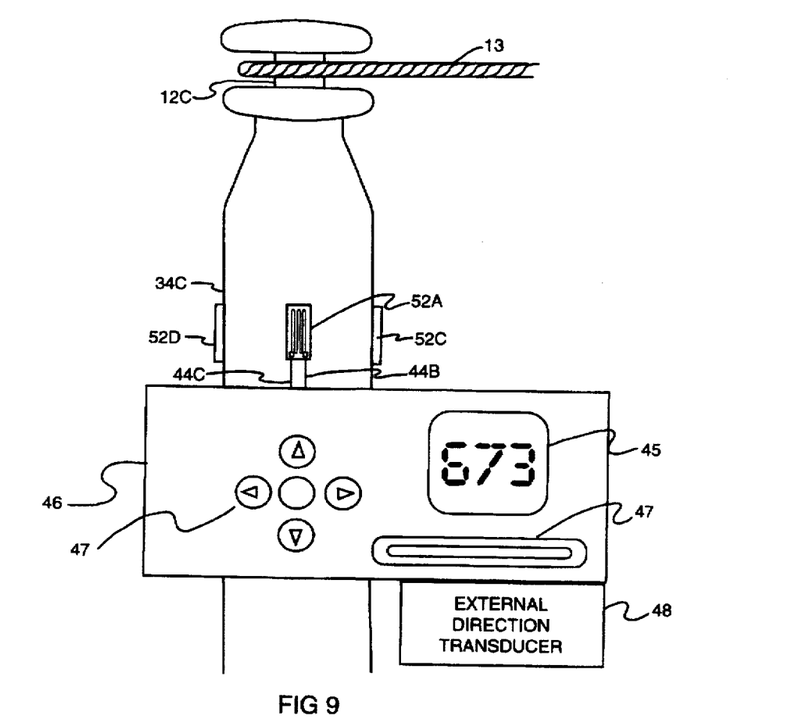
FIG. 9 shows a pylon equipped with strain gauges and also depicting electronic equipment utilized in the performance analysis.

FIG. 9 illustrates a different method of measuring the rope force direction. In FIG. 9, rope 13 loops around pylon 12C. In this case, it is not critical whether 12C is rigid or is free to rotate. On shaft 34C, there is depicted the three strain gauges referred to as 52A, 52C, and 52D. In this illustration, these strain gauges are located 90 degrees apart and a fourth strain gauge, 52B (not visible), would be located opposite to 52A. Alternatively, three stain gauges could be located at 120 degrees apart or even two strain gauges could be located is 90 degrees apart. A force on rope 13 would create stress and strain in shaft 34C. This would be sensed by two or more strain gauges. The direction and magnitude of the force exerted by rope 13 could be calculated using the information from these multiple strain gauges. For example, assume four strain gauges (90° separation) are oriented so that 52A and 52B are aligned parallel to the boat centerline 29 in FIG. 1. If the p strain gauges are matched so that the electrical signals can be vectorally added, then the force direction ($\theta$) and force magnitude (F) can be calculated as follows:

$$\text{Tan } \theta = (D-C)/(A-B)$$

$$F = K[(A-B)^2 + (D-C)^2]^{1/2}$$

Where A, B, C, and D are the electrical signals from 52A, 52B, 52C, and 52D respectively. K is a scaling constant to obtain the correct units of force. The sign of $\theta$ can be positive or negative, depending on the position of the skier and the polarity of the electrical signals. After the appropriate processing, the electrical signals go to the CPU which does the vector calculations. For further information on strain gauges, see books on the subject such as "The Pressure, Strain, and Force Handbook", published by Omega Engineering Inc., Stamford, Conn. Also, the two previously mentioned books on transducers describe strain gauges.

Force transducers such as strain gauges and some rotary transducers often need additional electronics to process the electrical signals before the signals are in a form which is compatible with common computer processing units. For example, strain gauges may require a power source, a "wheatstone bridge", and a volt meter. This electronic equipment is associated with signal processing and will be considered part of the CPU for purposes of this invention.

The illustration in FIG. 9 is design to show the principals involved. The exact shape of shaft 34C and the placement of the strain gauges can be optimized for making strain measurements. Note that FIG. 9 does illustrate that 12C is short compared to 12A in FIG. 2. This confines the vertical rope displacement and increases the accuracy of the strain measurement. Besides metal foil and semiconductor strain gauges, there are also various methods of measuring strain or deformation based on various other mechanical, optical, acoustic, pneumatic and electrical phenomena. These will all be defined as "force transducers."

In FIG. 9, the computer processing unit previously mentioned would be contained in box 46. The previously mentioned display screen is depicted as 45 and various input buttons are shown as 47. One of these buttons may be a "start" button. Information about the length of the rope could also be given to the CPU by these buttons. A slot for a computer diskette is depicted as 47.

In FIG. 9, there is also an additional box (48) labeled "direction sensor". Previously it was mentioned that it was sometimes possible for the orientation of the boat to be affected by the action of the skier. It is also possible for the driver of the boat to have to steer in order to overcome the sideways slippage caused by the skier pulling on the boat. This is particularly true if the ski boat is passing down a slalom ski course. Until now, examples had the ski rope direction measured relative to the boat. The reference direction was obtained from a portion of the pylon which was rigidly attached to the boat. However, it is possible to add an additional component of a direction sensor which tells the CPU at any instant the orientation of the boat relative to an external or absolute direction. Several examples of these are: a) an electronic compass can tell the orientation of the boat relative to magnetic north, (b) a radio direction finder which can determine the direction of a distant radio transmitter, (c) a rotating gyroscope or a laser gyroscope that can create an inertial frame of reference, and (d) a geo-positioning satellite receiver can give absolute direction and position, (e) a rotary accelerometer with a vertical axis and low friction bearing that can give a temporary inertial frame of reference. Any device which references a direction which is external to the boat will be called an absolute direction sensor. When an absolute direction sensor is available, an angle $\theta$ measured relative to the boat will referred to as $\theta_R$. The angle $\theta_R$ is measured relative to the boat center line with one angle sensor and the boat orientation relative to the absolute direction (such as magnetic north) will be measured with a second angle sensor and called $\theta_E$. The boat orientation, at the start of the measurement time, could be put into the memory of the CPU. For example, the starting boat orientation ($\theta_S$) could made to equal 0 degrees (0 radians) when the "start" is initiated. This boat orientation ($\theta_E$) could repetitively be measured similar to the multiple angular measurements previously discussed. The equation for making an absolute angle measurement at a particular instant in time is:

$$\theta_A = |\theta_R - \theta_S + \theta_T|.$$

If the "start" boat orientation is made, "0", then this equation becomes:

$$\theta_A = |\theta_R + \theta_T|.$$

It is also possible to make an absolute angle measurement in a single step process. In this case, the part of the angle sensing device which was previously described as connected to the boat reference (such as pin 35 in FIG. 4) instead is connected to an inertial reference device. This device could be a gyroscopically stabilized platform or a massive horizontal wheel mounted with low friction bearings. Once again, it is preferable to reset the "0" angle reference at the start of each measurement.

It should also be noted that it is most convenient to define the reference direction as the center line path depicted in FIG. 1. However, it should be known that the computations of rope direction can be made by the CPU relative to any reference orientation. Therefore, it is not essential to refer to the center line. This can be computed from any reference orientation.

Figure 10:
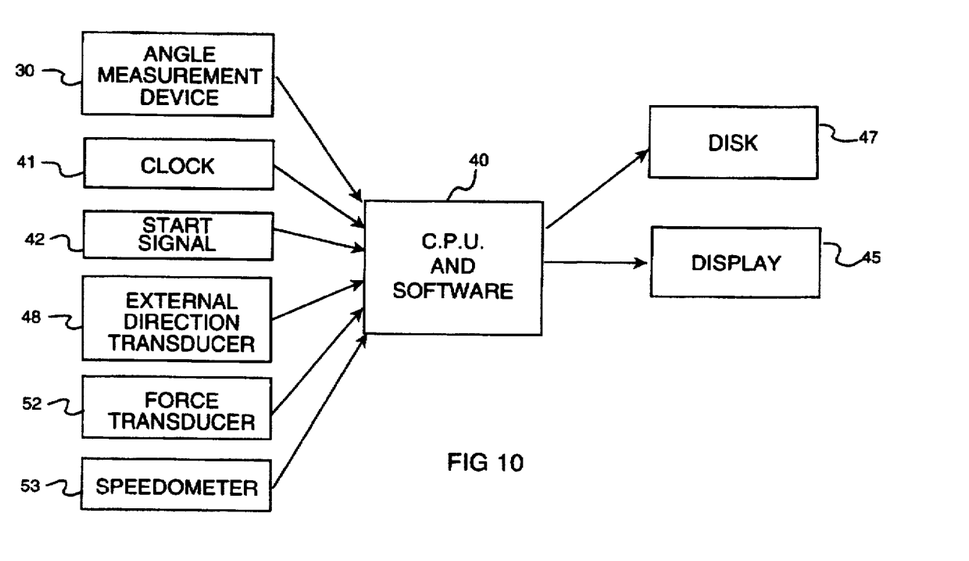
FIG. 10 shows a block diagram of the information flow for the water ski performance equipment.

In FIG. 10, there is a flow diagram showing the various components previously described. In this case, 30 is the angle measurement, device, 41, is the clock and 42 is the start signal. These are fed to the CPU and software unit which is denoted as 40. Computations are made and the result is fed to a display, 45, which provides a score or a graph. There are three optional input components: (a) 48 which is the absolute direction sensor, (b) 52 which is the force transducer, and (c) 53 which is a speedometer transducer. The information given to the CPU is processed to produce either a score or a graph which is displayed on 45. The score or graph can also be given to 47 which is a computer diskette. When the apparatus consists of multiple force transducers to determine the force direction (similar to the concept of FIG. 9), then the angle measurement device (30 in FIG. 10) and the force transducer become the same. If additional electronic equipment is needed to process these signals, then this can be considered as part of the force transducer units.

It should be understood that many ways exist to measure rope angle, force, and force angle. FIGS. 2, 4, 5, 6, 7, 8, and 9 show many alternatives. It is not practical to show every combination and permutation of these concepts. Difference combinations of the concepts presented here can be made without departing from the spirit and scope of the invention.

I claim:

1. A method of scoring the maneuverability of a water skier, said water skier pulled by a flexible rope which is connected to an attachment apparatus on a boat, said rope has a rope direction and a pivot axis, the steps comprising;
   measure repetitively, an angle between a predetermined reference direction and said rope direction using at least one rotary transducer which generates an electronic angle signal;
   measure a time interval associated with said angle measurements with a device which produces an electronic time signal;
   provide a computer processing unit which receives said angle signal and said time signal;
   compute a score relating to said maneuverability of said water skier utilizing said computer processing unit, said angle measurements and said time measurement.

2. The method according to claim 1 wherein the step of making said angle measurements includes having said reference direction be made relative to said boat.

3. The method according to claim 1 wherein the step of making said angle measurement includes having said reference direction be a fixed reference direction.

4. The method according to claim 1 wherein the step of measuring said time interval includes measuring the time required for said skier to complete a predetermined number of crossings of an imaginary reference line.

5. An apparatus for measuring the performance of a maneuvering water skier, being pulled by a ski rope which is connected to an attachment device mounted on a boat, the apparatus comprising;
   said attachment device has a predetermined orientation relative to said boat;
   said attachment device has at least two force transducers which respond to a force on said attachment device and produce electronic signals associated with a force magnitude and a force direction exerted on said attachment device;
   a computer processing unit which receives said electronic signals;
   an electronic timing device producing an electronic time signal which is electronically connected to said computer processing unit;
   said computer processing unit which is programmed to utilize said force signals and said time signal to compute a score means which relates to a performance measurement of said skier.

6. A method of analyzing a maneuvering water skier, said water skier being pulled by a boat with a ski rope connected to a pivot on said boat and said ski rope has a rope direction from said pivot, there is a distance between said pivot and said water skier, the steps in making said analysis, in no particular order comprising;
   provide a means of measuring time which generates an electronic time signal;
   determine a reference direction;
   provide a computational means;
   provide an angle measurement means which generates an electronic signal;
   make an angle measurement between said reference direction and said rope direction using said angle measurement means;
   make said angle measurement at an update rate faster than once a second;
   supply said computational means with said electronic time signal and said electronic angle signal;
   program said computational means with at least one mathematical formula which utilizes said angle signal and said time signal to compute an analysis of maneuvers of said water skier.

7. The method of claim 6, add the additional step of providing at least one force transducer which measures a force on said rope.

8. An apparatus which includes an attachment device for connecting a water ski rope to a boat such that said water ski rope can exert a force on said attachment device, said force can have a variable orientation direction, the apparatus comprising;
   at least two strain gauges connected to said attachment device;
   said strain gauges produce an electrical signal which is dependent on both said force and said orientation;
   a computer processing unit electrically connected to said strain gauges to receive said electrical signals;
   an electronic timing device connected to said computer processing unit;
   said computer processing unit programmed to measure said force and said variable orientation as a function of time.

9. An apparatus which includes an attachment device for connecting a water ski rope to a boat, the apparatus comprising;

a rotary transducer having a first part and a second part;

said first part of said rotary transducer connected to said attachment device so that said first part retains a fixed orientation relative to said boat;

said second part mounted so that said second part is free to rotate around a predetermined axis relative to said first part;

a coupling device which connects said second part and said ski rope such that a generally horizontal movement and pivoting of said ski rope around said attachment device produces a rotation of said second part of said rotary transducer and an electrical signal from said rotary; and a computer processing unit which is electrically connected to said rotary transducer, said computer processing unit programmed to utilize said electronic signals from said rotary transducer to compute a score means relating to said movement of said ski rope.

10. The apparatus according to claim 9 including a force transducer which is mechanically connected to said attachment device and electrically connected to said computer processing unit such that a force on said ski rope can be measured by said computer processing unit.

* * * * *